Sept. 24, 1963 S. A. MINERA 3,104,691
FRUIT STEMMER
Filed May 11, 1960 3 Sheets-Sheet 2
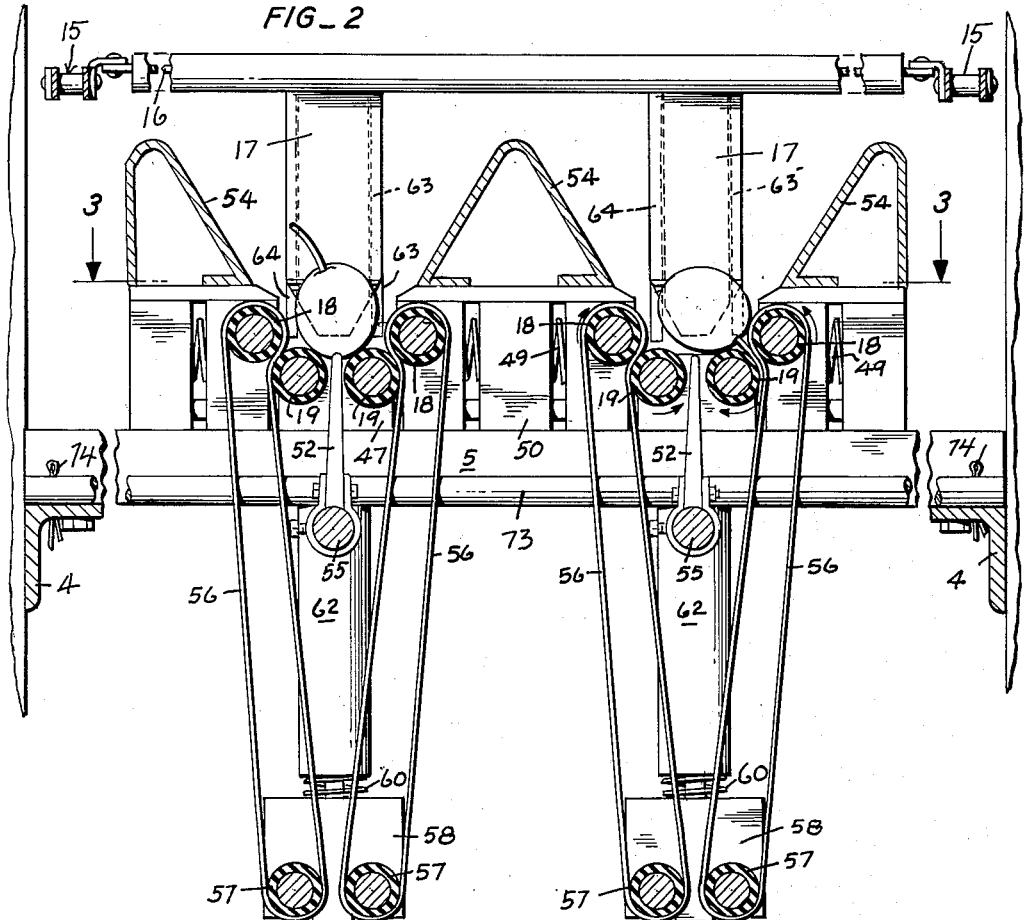
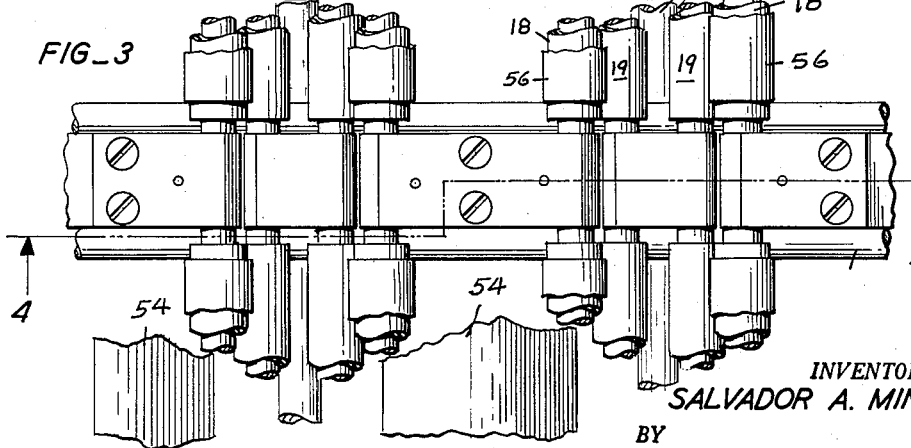
INVENTOR.
SALVADOR A. MINERA
BY
ATTORNEYS

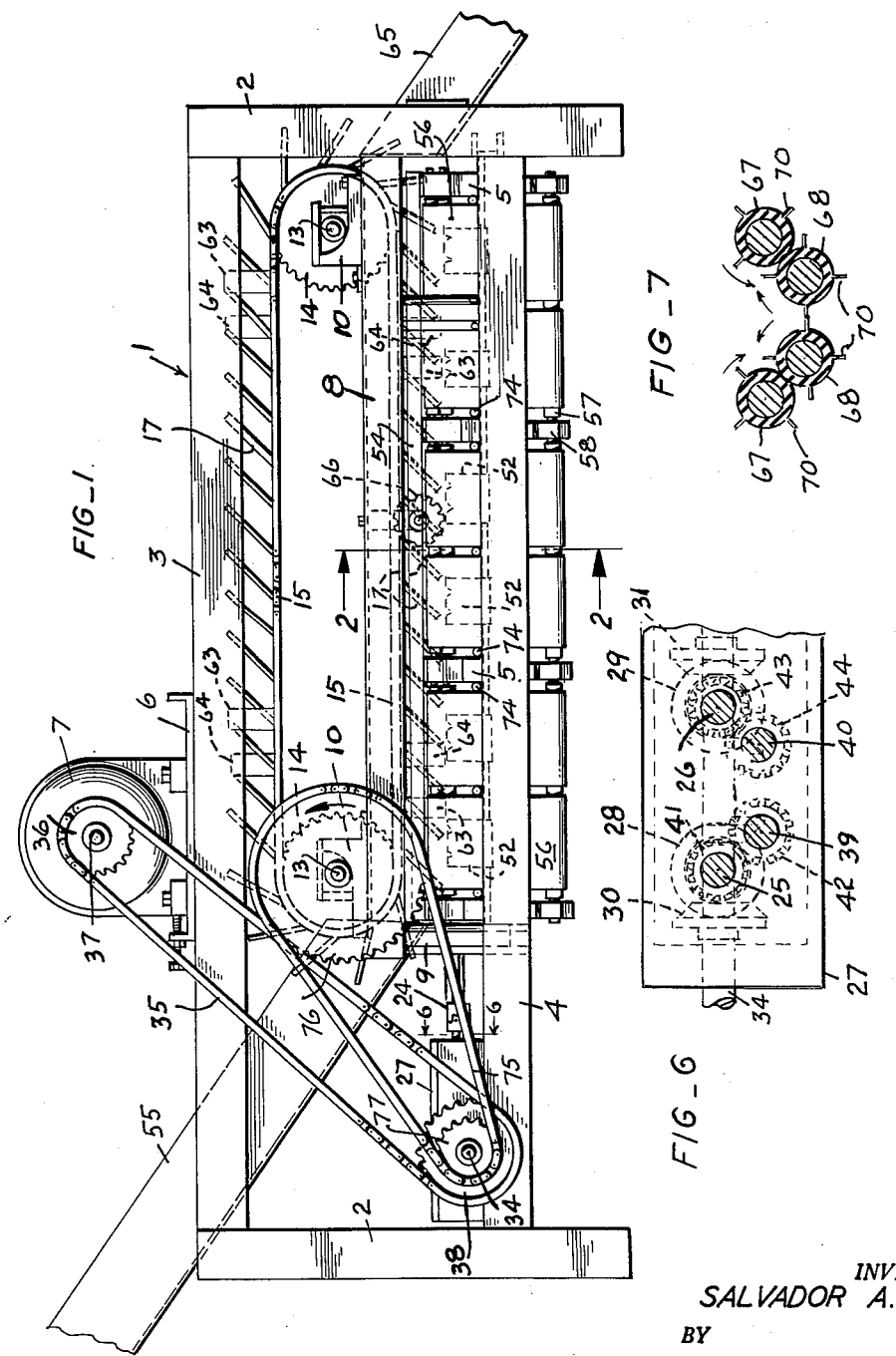

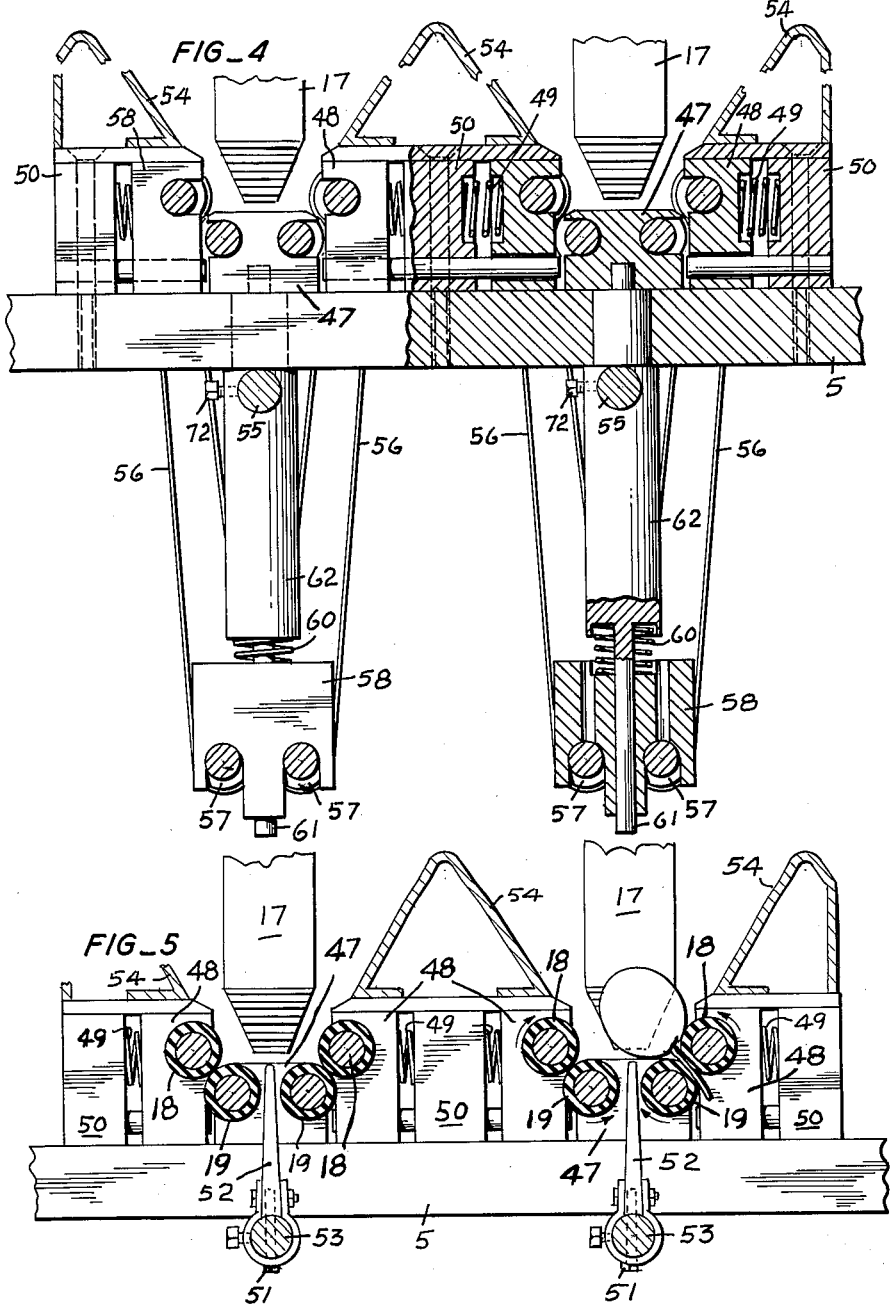

United States Patent Office 3,104,691
Patented Sept. 24, 1963

3,104,691
FRUIT STEMMER
Salvador Aguilar Minera, 1500 Judah St.,
San Francisco, Calif.
Filed May 11, 1960, Ser. No. 28,307
11 Claims. (Cl. 146—55)

This invention relates to a fruit stemmer, and has for one of its objects the provision of a fruit stemming machine that is adapted to remove the stems from fruit, such as grapes, cherries, olives and the like, more efficiently than heretofore.

Another object of the invention is the provision of a machine that is adapted to remove stems from fruit, such as cherries, that have heretofore been quite difficult, and, in many instances impossible to remove, except by hand, due to the tenacity with which they hold to the stone or fruit.

A still further object of the invention is the provision of a machine that is adapted to efficiently remove its stems from relatively spherical or irregularly shaped fruit, such as cherries, and from spherical grapes and from elongated fruit, such as elongated grapes and olives.

Cherries normally have long stems. They also come in clusters, having their stems connected. The stems usually have a relatively weak point along their lengths, and many of the stems break at these points, leaving the cherries with relatively short stems. Also some undeveloped and deformed cherries have stems that are so firmly grown to fruit or stones, as to require a pull of very substantial force to separate the stems from the fruit. In most cherries a strong pull of up to three pounds force and more may be required to remove the stems, which to a certain extent, accounts for many stems being broken in attempts to stem them, and heretofore these cherries that have broken stems attached thereto must be manually handled, individually, to remove the stems.

As a result of the above, the expense of maintaining an adequate number of inspectors along a conveyor carrying cherries away from the stemming machines heretofore used, in order to pick out the unstemmed cherries is high. The further expense of requiring an operator to stem each of the unstemmed cherries adds to the present high cost of preparing cherries for canning.

With the present invention virtually all of the cherries having either short or long stems are quickly and efficiently stemmed. Nor does the stemmer break the long stems. Where undeveloped and deformed cherries have heretofore entered a cherry stemming machine, the difficulty of pulling the stems from such cherries has resulted in some instances in causing the machine to become choked with fruit. This results in injury to cherries, and failure to stem many cherries until the machine is cleared of the cherries that are stalled. With the present machine such cherries are stemmed, and while they may not be canned, their efficient stemming results in keeping the machine cleared so that there is no impairment in the efficiency of the machine for stemming the other cherries.

Grape stems are more readily pulled from grapes than from cherries, but the problem of insuring efficient stemming of the grapes so that none of the grapes or only a minimum number of grapes will pass the stemmer without having their stems removed is still present. Where some grapes may be substantially spherical while others quite elongated, there exists the problem of so controlling the movements of the grapes as to pluck their stems from them. Machines that will stem elongated grapes with relatively high efficiency, such as shown in my copending application Serial No. 17,280, now U.S. Patent No. 3,036,613, are not as efficient in stemming spherical grapes.

Furthermore, in structures heretofore used, there are some grapes that will slide along stemming rollers irrespective of the expedients employed to compel them to roll so that their stems will be caught between the rollers. The same problem exists with olives.

While increasing the length of travel of the fruit may go far toward solving the problem of stemming virtually all of the grapes, such structure would result in manipulating the grapes more than would be necessary, and also valuable additional space would be required for the machines, to say nothing of the increased time that would be required as a result of lengthening the travel and the added cost of the machines.

With the present invention, the grapes are held in the machine for only a very short time, thus increasing the capacity of the machine; a saving in space; and a reduction in the time the grapes are manipulated. Also the efficiency is increased to the point where substantially one hundred percent of the grapes are stemmed. This is also true of olives and cherries.

Other objects and advantages will appear in the description and in the drawings.

In the drawings, FIG. 1 is a side elevational view of a stemmer that is adapted to stem grapes, olives, cherries, and certain varieties of plums.

FIG. 2 is an enlarged sectional view at line 2—2 of FIG. 1.

FIG. 3 is a fragmentary sectional view as seen from line 3—3 of FIG. 2.

FIG. 4 is a fragmentary sectional view as seen from line 4—4 of FIG. 3.

FIG. 5 is a cross sectional view similar to that of FIG. 2 but with the belts shown in FIG. 2 omitted.

FIG. 6 is an enlarged fragmentary sectional view taken along line 6—6 of FIG. 1.

FIG. 7 is a sectional view taken through a set of rollers of the same general type shown in FIGS. 2 and 7, but having thin flexible radially extending vanes thereon.

In detail the machine illustrated in the drawings comprises a frame (FIG. 1) generally designated 1, having legs 2; upper and lower horizontal elongated side frame members 3, 4 and a plurality of cross frame members 5 extending between said lower side frame members, while other suitable cross frame members may extend between the upper side frame members 3, one of which may be a support 6 for a motor 7. Spaced between the upper and lower side frame members are similar, but shorter side frame members 8, that extend from the legs 2 at the discharge end of the machine and supports 9 that are supported by the lower side frame members 3 at a point spaced from the legs 2 at the feed end of the machine. In FIG. 1 the feed end is at its left hand end of the figure, while the discharge end is at the right hand end.

These side frame members 8 carry bearings 10 at its opposite ends, which bearings support horizontal shafts 13, each of which has a pair of sprocket wheels 14 secured to opposite ends thereof. These bearings are fully described in copending application Serial No. 17,280, now U.S. Patent No. 3,036,613, filed March 24, 1960 entitled, Fruit Stemming Machine.

Sprocket chains 15 extend around the sprocket wheels at the ends of the shafts 13 and links of such chains support bars 16 (FIG. 2) that, in turn have depending, flexible, flat sided members 17 of rubber or composition material. These members may be called "pusher flaps" since they function to urge fruit bodies along a path of travel and to cause such bodies to both roll and to be yieldably urged downwardly as they pass over the fruit during travel of the latter in such path. Their structure is similar to the structure shown and described in my United States Patent No. 2,819,745 of January 14, 1958.

Said pusher flaps are preferably slanted relative to vertical, substantially as shown in the aforesaid application, so their upper edges lead the lower edges when shafts 13 are rotated by motor 7. One of the flat sides of each of said members faces in the general direction of the path in which the flaps are moved, and also downwardly (FIG. 1).

The flaps are molded at their upper ends around flat sided bars 16, and said one of their faces is preferably formed with horizontal ribs 12 (FIG. 4) at their lower end portions where they engage and pass over fruit bodies. These flaps will be described more in detail later on with respect to the differences between them and those enclosed in the aforesaid patent.

The stemming rollers and construction of FIG. 5 will be considered first for the reason that this is the basic machine, to which certain elements may be added as will appear in the other figures for stemming the more difficult fruit, such as cherries and in some instances for olives. The stemmer of FIG. 5 is adequate for grapes, and is usually adequate for olives.

Spaced below the lower runs of the chains 15 and in the downwardly projected space between said chains, are sets of rollers, each set comprising a pair of two horizontally spaced pairs of horizontally elongated parallel rollers with the rollers of each pair being in engaging relation. These pairs of rollers in each set are arranged to form the sides and bottom of a horizontally extending channel, one pair forming one side and part of the bottom and the other pair forming the other side and part of the bottom, leaving a gap or space in the bottom.

In order to form the above, the rollers in each pair thereof are arranged with one above the other, with the lower rollers of the two pairs closer together than the upper rollers. The spacing between the upper rollers is greater than the maximum width of the fruit to be stemmed, while the spacing between the lower rollers is sufficient to permit the stems to freely pass between the lower rollers where no obstacle is presented.

The upper roller of each pair is designated 18, while the lower roller of each pair is designated 19. Said rollers are preferably of the same diameter and are rubber or plastic covered steel rods. The rubber or plastic covering may be in the form of tubes tightly but removably fitted over the rods so as to be replaceable when worn, and said rubber or plastic is relatively soft and resilient.

The upper rollers of each set are connected by universal couplings 24, at the feed end of the machine, with shafts 25, 26 (FIG. 6) that extend into the gear box 27. Bevel gears 28, 29 are respectively secured on the ends of said shafts, which bevel gears have their teeth in mesh with bevel gears 30, 31 that are secured on shaft 34 that is driven by motor 7 (FIG. 1) through a sprocket chain 35 connecting sprocket wheel 36 on the motor shaft 37 with sprocket wheel 38 on shaft 34.

The lower rollers 19 of each set are connected by universal couplings with shafts 39, 40 (FIG. 6) that also extend into gear box 27. Shafts 25, 39 are connected by spur gears 41, 42 for being power driven from bevel gears 28, 30 and shafts 26, 40 are connected by spur gears 43, 44 for being driven from bevel gears 29, 31 when shaft 34 is rotated.

The direction of rotation of shaft 34 is such that the rollers 18, 19 at each of the opposite sides of each set will rotate outwardly at their engaging sides relative to the space between the pairs of rollers and their speed of rotation is preferably relatively high, or approximately 600 r.p.m.

Actually, the rubber covering on each roller is in spaced sections to provide for a plurality of bearings along each roller. This structure is clearly shown in my United States Patent No. 2,819,745 and the bearings along the shaft are seen in FIG. 1.

In the present instance, as seen in FIG. 5, the bearings 47 for the lower rollers 19 in each set are stationary, and are laterally open at one of their sides as seen in FIG. 4. The bearings 48 for the upper rollers 18 of each set are movable toward bearings 47 on cross frame members 5. The opposite facing sides of these bearings are open and expansion springs 49 compressed between stationary members 50 adjacent to bearings 48, and said springs yieldably urge bearings 48 in each set toward each other to urge rollers 18 into yieldable engagement with the rollers 19. The degree of pressure with which rollers 18 are urged against rollers 19 is regulated by the strength of the springs and their degree of compression.

Rods 53 extend transversely below the cross members 5 and, as seen in FIG. 5, said rods are secured to said frame members 5 by screws 51. These bars have upstanding rubber or relatively soft ribs 52 secured thereto, which ribs extend between the lower rollers 19 of each set of rollers, in slightly spaced relation to said rollers. Said ribs project upwardly at their upper edges far enough to cooperate with each of the lower rollers at opposite sides thereof for supporting a fruit body that is between the pairs of rollers at said opposite sides of each rib. The engagement between the upper edges of said ribs and the fruit bodies will prevent such bodies from being slid along the lower rollers under the influence of the pusher flaps 17, and will insure rolling of the fruit bodies.

The pusher flaps 17 may be formed at their lower end portions to have convergently downwardly extending side edges, and their widths may vary, as may their exact contours, according to the fruit being stemmed.

Elongated guide strips 54 supported over the bearings between and alongside the several sets of rollers function to guide the fruit to the sets of rollers and between the two pairs of rollers of each set.

As above noted, all of the structure so far described is found in all of the views, except that belts, later described, are extended over the upper roller 18 in FIGS. 1 to 5, hence the belts engage the rollers 19 in FIG. 1 to 5 instead of the two rollers being in engagement.

Insofar as FIG. 5 is concerned, in operation, the grapes, olives and the like may be fed onto the rollers at the feed end of the machine from a chute 55 (FIG. 1). Upon said fruit bodies being deposited in the channels formed by the sets of rollers, they will immediately engage the lower rollers 18 and will tend to automatically have their major axes positioned cross wise of the length of the channel, and their stems will be caught between the pair of rollers at the side toward which the stems project. As soon as the stems engage one of the rollers, at either side of the channel, the stems will be drawn between the rollers at such side and will be plucked from the fruit. The fruit bodies actually are rotated about changing axes as they are rolled and moved by the pusher flaps along the rollers. This is due to the rollers and ribs 52, although were the ribs omitted, they would still roll about changing axes since the stems unbalance the fruit and the stems may engage any one of the four rollers at different angles.

Assume the pusher flaps were not being used to move the fruit along the channel, and the channel is filled with a row of fruit bodies. Upon rotating the rollers of the set, in a matter of one or two seconds, the stems will almost all be plucked from the fruit bodies. Thus the pusher flaps function more to clear the channel, than to insure stemming of the fruit, but they still contribute to expediting the time of stemming.

With the structure described, there are two relatively widely spaced points in the channel at which stems may be caught, instead of only one, as occurs where a single pair of rollers are used. This results in a much faster and more certain stemming of the fruit.

Spherical grapes and the like that are rolled or moved longitudinally of each channel formed by each set of four rollers in the present arrangement are more or less thrown upwardly and from side to side so their stems do not fail to be quickly caught between one or the other of the pairs of rollers.

The addition to the structure of FIG. 5, as shown in FIGS. 1 to 4, comprises the extending of relatively thin pure rubber belts 56 over the upper rollers 18 of each set and over a set of lower similar pulling rollers 57. These lower rollers are positioned relatively close together so that the belts will partially wrap around the lower rollers 19, and bearing blocks 58 mounting the pulley rollers 57 are spring urged downwardly by springs 60 (FIG. 2) to maintain the belts under tension. These blocks 58 are slidable on downward extensions 61 of posts 62 that are secured at their upper ends to cross frame members 5 (FIG. 4).

This is the main distinction between the machine of FIG. 5 and the machine of FIGS. 1 to 4 and it provides a stem gripping surface between the rollers of each pair in each set that will insure pulling the stems from the cherries.

Heretofore the stemming of cherries has been relatively slow and the cherries are oriented so their stems project to the same side of a path of travel. In such stemmers, the stems are usually caught, for stemming, at points spaced more than one half inch from the bodies of the cherries, or else the stems are given a sharp kink or turn upon being held for pulling them from the stems.

Most cherry stems have a weak point averaging about one half inch from the cherries, and the stems are easily broken at this point.

As a result of the above, many canners have large quantities of cherries, in storage, that have broken stems, and that are waiting to be manually stemmed by operators that must handle the individual cherries for moving the projecting stem into engagement with a generally V-shaped stationary stem gripping device.

When the stem is caught, the operator continues movement of the cherry to pull the cherry away from the stem.

The roller-belt combinations shown in this application overcome the above difficulty since the stems of less than one half inch in length are readily caught and are tightly gripped between the belt extending over roller 18, and roller 19, and each belt 56 extends around and in tight engagement with roller 19 for substantially the full length of the stem. Obviously the belts 56 could be mounted to extend almost half way around the roller 19 adjacent thereto, if desired. However, any such engagement for a length longer than the stems would be superfluous.

It should be mentioned that it requires a pull of from several to approvimately five or six pounds to separate the stems from cherries, and in some instances, particularly in the case of deformed and undeveloped cherries, the stems are so securely connected with the stones that the roller and belt combinations will slip on the stems before the stems are pulled from the stones. In order to overcome this last problem, one or more pairs of flexible rubber strips 63, 64 are secured along an edge of certain pusher flaps 17 so as to be carried edgewise alongside the rollers 18 as seen in FIGS. 1 and 2. One of these strips 63 is along the edge of one pusher flap and the other strip 64 may be along the edge of an adjacent or other flap, at the other side of the channel. FIG. 1 shows four such sets. These strips resist bending in the direction of travel of the pusher flaps and will engage any cherries that may be held by a slipping engagement of the stem between a belt and roller at either side of the channel to thereby knock such cherries off their stems.

The pusher flap alongside each strip 63 and 64 is reduced in width to accommodate each such strip.

The stems, after being plucked from the cherries, will fall below the rollers and any suitable means, such as a collector, chute, conveyor, etc. (not shown) may receive them. The stemmed cherries will be moved off the discharge end of the machine onto a discharge chute 65 (FIG. 1).

If desired, the ribs 52 may be merely fingers, or may be of greater width, as shown in FIG. 1 and they may have irregular or notched upper edges, as desired. In certain instances, they may be omitted, where the fruit does not tend to slide along the rollers without rotating.

One or more idler sprockets 66 at a point intermediate or points intermediate the length of the lower flight of pusher flaps may be suspended from side frame members 3 to engage below the lower runs of chains 15 to prevent sagging of the lower flight of pusher flaps.

FIG. 7 shows a modified form of rollers that are arranged and are driven in the same manner as the rollers of FIG. 5. The upper rollers 67 of the set shown, and the lower rollers 68 thereof are formed with thin, flexible, radially projecting vanes 70 that extend from end to end of the rubber covering of the rollers. These may project only a relatively slight distance from the rollers. In FIG. 7 they project only approximately half the distance between the lower rollers 68, and they are arranged on the rollers so that the vanes on the upper roller 67 at each side of the channel formed by the rollers alternate with those on the lower roller 68 of each pair. The vane on the upper roller that is next to the lower roller, in the position seen in FIG. 7, is pressed between the rollers so it practically disappears and it does not lap any of the other vanes. The thickness of these vanes is so slight that they cannot injure the cherries, but nevertheless they will contribute to agitating the cherries and to direct their stems to between the pairs of rollers at either side of the channel. Any desired number of ribs may be used on the rollers, the number shown being merely illustrative. As already stated, these rollers preferably rotate at relatively high speed, hence even one vane on each of the rollers would be effective, while two at opposite points would be likely to be most easily formed in a split mold along the junctures between the mold halves.

The cross frame members 5 of FIG. 5, may, if desired, be formed with openings for the securement of posts 62 of FIG. 4 thereto, or these openings may be formed later. If formed later, screws 51 may first secure bars 53 to the cross frame members, and if the device is converted for belts, the screws 72 (FIG. 4) may secure bars 55 to posts 62.

Belts 56 will normally stay on the rubber sections of the rollers, but to insure against displacement axially of the rollers, cross bars 73 may be disposed between adjacent belts, said bars being secured to side frame members 4 by any suitable means, such as cotter pins 74 indicated in FIG. 2.

The sprocket wheels 14 (FIG. 1) that mount the chains 15 and pusher flaps 17 are actuated by a sprocket chain 75 connecting a sprocket wheel 76 secured on shaft 13 with a sprocket wheel 77 secured on shaft 34.

Generally, as seen from the foregoing description, the method practiced in the stemming of fruit bodies having stems projecting therefrom, such as grapes, cherries, olives and the like, is that of moving such bodies in one general direction along a predetermined path of travel and, during said movement, rotating said bodies about changing axes including an axis extending generally in said one direction with the stem projecting transversely thereof for moving said stems to one lateral side of said path upon said rotation about said axis, and plucking the stems from said bodies at said lateral side of said path upon said stems being moved to said one lateral side. An amplification of the above method would include the plucking of the stems from the bodies at either one lateral side of said path or the other.

This method varies appreciably from that of attempting to move the fruit about an axis extending transversely of the path of travel with the stem disposed in a vertical plane in which said path is disposed, which is the heretofore practiced method.

It is apparent, however, that any stem that engages one of the rollers at either side of the path of travel will tend to be drawn between the rollers and plucked from the fruit. Thus if a body is moved along the path of travel longitudinally of the rollers, and between the two pairs of rollers in a set of four thereof, and the stem-blossom axis is in a vertical plane in which said path is disposed, but the stem curves to project laterally from said path, such stem, if sufficiently long, will be caught between the rollers and plucked from the body. However, all of the bodies will be caused, at some time or other, to rotate to swing the stems to positions projecting to one side or the other of the path of travel of the bodies.

Also, in brief, the apparatus comprises one or more horizontally extending upwardly opening channels each having horizontally spaced, parallel sides and a bottom, and in which channel fruit bodies having stems projecting therefrom are adapted to be positioned. Each of the sides of each channel comprises a pair of horizontally elongated horizontally spaced stem grippers each having opposed stem gripping surfaces adapted to grip said stems therebetween.

Bearings 47, 48 support said stem grippers for movement of said stem gripping surfaces of each gripper toward each other into engagement and outwardly relative to the space between said grippers for drawing said stems between said surfaces and pulling them from the bodies to which they are attached. The shafts, gears and motor, as described in detail, provides means for effecting the aforesaid movement of said surfaces, and means in the form of portions of the lower rollers or ribs 52 or the combination thereof, provides means for supporting the fruit bodies in a single row extending longitudinally of and between said stem grippers adjacent to said surfaces on each of the stem grippers.

It is to be understood that the claims appended hereto are intended to cover all changes and modifications of the examples of the invention herein chosen for purposes of the disclosure, and which do not constitute departures from the spirit and scope of the invention.

I claim:

1. A fruit stemmer comprising; a horizontally elongated upwardly opening channel having horizontally spaced sides and a bottom, and in which channel fruit bodies having stems projecting therefrom are adapted to be positioned, said sides each including a pair of parallel, horizontally extending stem gripping rollers disposed in engagement one above the other, means connected with the rollers of each pair for rotating them for movement of their adjacent sides outwardly relative to the space between said sides for drawing stems on such bodies between the rollers of each of said pairs according to the side to which said stems project for pulling said stems from said bodies, said bottom including means positioned between the lower of the pairs of rollers defining the opposite sides of said channel and projecting upwardly a sufficient distance to cooperate with the lower rollers of said pairs for supporting said bodies in the bottom of said channel.

2. A fruit stemmer comprising; a horizontally elongated upwardly opening channel having horizontally spaced sides and a bottom, and in which channel fruit bodies having stems projecting therefrom are adapted to be positioned, each of said sides including a pair of parallel, horizontally extending stem gripping rollers disposed in engagement one above the other, means connected with the rollers of each pair for rotating them for movement of their adjacent sides outwardly relative to the space between said sides for drawing stems on such bodies that have stems engage one of the rollers of each pair between the roller so engaged by the stem and the roller in engagement therewith to pull such stems from the fruit bodies, and said bottom including a member extending longitudinally of said rollers, substantially midway between the lower roller of said pairs thereof and spaced therefrom adapted to support fruit bodies tilted to one of said sides or the other and against one or the other pair of rollers that form one side or the other of said channel.

3. A fruit stemmer comprising; two horizontally extending, horizontally spaced pairs of parallel rollers, the rollers of each pair being disposed in engagement one over the other, means connecting the rollers of each pair for simultaneous rotation in directions for movement of their adjacent sides outwardly relative to the space between said pairs of rollers, means supporting said pairs of rollers for said rotation thereof, the lower rollers of said pair being closer together than the upper rollers, fruit supporting means stationary relative to the rotary movement of said rollers disposed between said lower rollers of said pairs and extending longitudinally of said rollers adapted to cooperate with said lower rollers to support fruit bodies thereon for rotation of such bodies generally about axes extending in the same direction as the longitudinal axes of said rollers, fruit engaging means extending between the upper rollers of said pairs for engagement with fruit disposed on said lower rollers, means connected with said fruit engaging means for moving it longitudinally of said rollers for moving fruit bodies on said lower rollers and on said fruit supporting means longitudinally of said lower rollers during rotation of said lower rollers about their longitudinal axes, said fruit engaging means being flexible flaps adapted to flex for movement over fruit on said lower rollers, means supporting said fruit engaging means for said movement.

4. A fruit stemmer comprising; two horizontally extending, horizontally spaced pairs of parallel rollers, the rollers of each pair being disposed in engagement one over the other, means connecting the rollers of each pair for simultaneous rotation in directions for movement of their adjacent sides outwardly relative to the space between said pairs of rollers, means supporting said pairs of rollers for said rotation thereof, the lower rollers of said pair being closer together than the upper rollers and being adapted to support fruit bodies thereon for rotation of such bodies generally about axes extending in the same direction as the longitudinal axes of said rollers, fruit engaging means extending between the upper rollers of said pairs for engagement with fruit disposed on said lower rollers, means connected with said fruit engaging means for moving it longitudinally of said rollers for moving fruit bodies on said lower rollers longitudinally of said lower rollers during rotation of said lower rollers about their longitudinal axes, said fruit engaging means being flexible flaps adapted to flex for movement over fruit on said lower rollers, means supporting said fruit engaging means for said movement, members carried by said last mentioned means extending between said rollers closely adjacent to the rollers of each pair and spaced apart in a direction transversely of their direction of movement, said members being relatively rigid against flexing in the same direction as said fruit engaging means for knocking fruit bodies from stems held between said pairs of rollers but not separated from the fruit bodies.

5. A fruit stemmer comprising two horizontally spaced pairs of parallel rollers in which the rollers of each pair are positioned one over the other, means mounting the rollers of one pair thereof for yieldable movement toward the rollers of the other pair and for rotation of the two pairs of rollers, means connected with said rollers for rotating the rollers of each pair in directions for movement of their adjacent sides outwardly relative to the space between the two pairs of rollers, an endless belt extending around one roller of each pair and a substantial distance around and in close engagement with the outer surface of the other roller that is adjacent thereto relative to said space between said rollers, whereby the projecting stem on a fruit body disposed between said pairs of rollers and engaged between said other roller of each pair and said belt will be gripped between said belt and said other roller for pulling said stem from such fruit body.

6. A fruit stemmer comprising two horizontally spaced pairs of parallel rollers in which the rollers of each pair are positioned one over the other, means mounting the rollers of one pair thereof for yieldable movement toward the rollers of the other pair and for rotation of the two pairs of rollers, means connected with said rollers for rotating the rollers of each pair in directions for movement of their adjacent sides outwardly relative to the space between the two pairs of rollers, an endless belt extending around one roller of each pair and a substantial distance around and in close engagement with the outer surface of the other roller that is adjacent thereto relative to said space between said rollers, whereby the projecting stem on a fruit body disposed between said pairs of rollers and engaged between said other roller of each pair and said belt will be gripped between said belt and said other roller for pulling said stem from such fruit body, fruit supporting means between said pairs of rollers adapted to cooperate with the lower rollers of said pairs for supporting fruit bodies having projecting stems thereon between said pairs of rollers, fruit moving means extending between said pairs of rollers movable longitudinally of the latter for moving fruit bodies on said supporting means and between said pairs of said rollers longitudinally of said rollers, means connected with said fruit moving means for so moving the latter, and means mounting said fruit moving means in a position between said pairs of rollers.

7. A fruit stemmer comprising: two horizontally spaced pairs of parallel rollers in which the rollers of each pair are positioned one over the other, means mounting the rollers of one pair thereof for yieldable movement toward the rollers of the other pair and for rotation of the two pairs of rollers, means connected with said rollers for rotating the rollers of each pair in directions for movement of their adjacent sides outwardly relative to the space between the two pairs of rollers, an endless belt extending around one roller of each pair and a substantial distance around and in close engagement with the outer surface of the other roller that is adjacent thereto relative to said space between said rollers whereby the projecting stem on a fruit body disposed between said pairs of rollers and engaged between said other roller of each pair and said belt will be gripped between said belt and said other roller for pulling said stem from such fruit body, a pair of pulley rollers over which each of said belts extend, means mounting said pulley rollers for rotation and means connected with said pulley rollers for yieldably holding said belts taut.

8. A fruit stemmer for stemming fruit bodies having stems projecting therefrom comprising two horizontally spaced pairs of parallel rollers in which the rollers of each pair are spaced one above the other with the upper rollers of said pair spaced apart a greater distance than the lower rollers, said lower rollers being spaced a relatively small distance apart substantially less than the diameters of the fruit bodies to be stemmed for supporting such fruit bodies thereon, means supporting said rollers for rotation, an endless belt extending over the upper roller of each pair in close engagement with the side of the roller therebelow adjacent thereto and with the outer surface of the latter roller for a substantial distance, a pair of pulley rollers below said two pairs of rollers over which said belts extend, means supporting said pulley rollers for rotation, and for downward movement relative to said pairs of rollers, and means operatively connected with said pulley rollers for yieldably urging them downwardly to maintain said belts taut, means connected with said pairs of rollers for rotating the rollers of each pair in directions for movement of their adjacent sides outwardly relative to the space between said pairs.

9. A fruit stemmer comprising; a pair of horizontally elongated, horizontally spaced stem grippers between which fruit bodies having projecting stems thereon are adapted to be positioned for stemming, said stem grippers each having substantially opposed stem gripping surfaces adapted to grip said stems therebetween, means supporting said stem grippers for movement of said surfaces progressively toward each other into engagement and outwardly relative to the space between said grippers for drawing said stems between said surfaces and pulling them from the bodies to which they are attached, means connected with said stem grippers for effecting said movement of said surfaces, means stationary relative to said movement of said stem gripping surfaces disposed between said stem grippers adjacent to the lower portions of the latter adapted to cooperate with said portions for supporting such fruit bodies in generally a single row extending longitudinally of and between said stem grippers and adjacent to the said surfaces on each of said stem grippers.

10. A fruit stemmer comprising; a pair of horizontally elongated, horizontally spaced stem grippers between which fruit bodies having projecting stems thereon are adapted to be positioned for stemming, said stem grippers each having substantially opposed stem gripping surfaces adapted to grip said stems therebetween, means supporting said stem grippers for movement of said surfaces progressively toward each other into engagement and outwardly relative to the space between said grippers for drawing said stems between said surfaces and pulling them from the bodies to which they are attached, means connected with said stem grippers for effecting said movement of said surfaces, means stationary relative to said movement of said stem gripping surfaces disposed between said stem grippers adjacent to the lower portions of the latter adapted to cooperate with said portions for supporting such fruit bodies in generally a single row extending longitudinally of and between said stem grippers and adjacent to the said surfaces on each of said stem grippers, said portions of said stem grippers being rollers in which the surfaces adjacent to said last mentioned means is moved upwardly and oppositely outwardly and away from said last mentioned means when movement of said stem gripping surfaces is effected, fruit moving means disposed between said stem grippers movable longitudinally of the stem gripping means into engagement with fruit bodies of said row for moving said fruit bodies substantially from end to end of said stem grippers and means connected with said fruit moving means for so moving the latter.

11. A fruit stemmer comprising, a pair of horizontally elongated, horizontally spaced stem grippers defining opposite sides of a horizontally elongated channel between which sides fruit bodies having projecting stems thereon are adapted to be positioned for stemming; said stem grippers each having cylindrical, resilient, elastic stem gripping surfaces adapted to grip stems therebetween for pulling the bodies connected therewith against said surfaces and then pulling said stems from said bodies upon movement of said surfaces at each side of said channel toward and into engagement with each other and outwardly of said channel; means supporting said stem grippers for said movement of the said surfaces of each and means connected with said grippers for so moving the said surfaces; said stem grippers each including lower portions thereof spaced apart less than the largest diameter of the bodies to be stemmed; fruit supporting means positioned in the space between said lower portions adapted to support fruit bodies thereon for movement of the latter from one end of said channel to the other; fruit moving means extending into said channel and movable longitudinally of said fruit grippers from said one end of said channel to the other for moving bodies in said channel from said one end thereof to the other, means supporting said fruit moving means for said movement and means connected with said fruit moving means for so moving the latter.

References Cited in the file of this patent

UNITED STATES PATENTS

| | | |
|---|---|---|
| 1,071,925 | Keith | Sept. 2, 1913 |
| 1,835,190 | Stansbury | Dec. 8, 1931 |
| 1,924,111 | Erickson | Aug. 29, 1933 |
| 2,508,728 | Stansbury | May 23, 1950 |
| 2,719,555 | Wood | Oct. 4, 1955 |
| 2,819,745 | Minera | Jan. 14, 1958 |